June 2, 1959      E. F. GOETZ      2,889,014

TWO-SHOE BRAKE MECHANISM

Filed May 12, 1955

INVENTOR:
ERNEST F. GOETZ

BY Raymond A. Miles

HIS ATTORNEY

United States Patent Office 2,889,014
Patented June 2, 1959

2,889,014

TWO-SHOE BRAKE MECHANISM

Ernest F. Goetz, Schenectady, N.Y., assignor to General Electric Company, a corporation of New York Application May 12, 1955, Serial No. 507,920

11 Claims. (Cl. 188—171)

My invention relates to brakes, particularly two-shoe brakes, and provides improved mechanism for adjusting and controlling the operating linkage that applies and releases the shoes, to effect automatically proper positioning of both brake shoes when the brake is installed, to automatically equalize the release of both shoes, to compensate for brake lining wear, and also to facilitate the replacement of worn linings.

Although not necessarily limited thereto, the improvements of the present invention are of particular advantage in two-shoe electromagnetic brakes having a floating lever type of operating linkage, as disclosed and claimed in the copending patent application of Alonzo W. Noon, Ser. No. 505,585, filed May 3, 1955, now Patent #2,830,682, and assigned to the assignee of the present invention.

With any two-shoe electromagnetic brake, the application and release of the shoes can be readily controlled electrically. Consequently, this type of brake is now widely used for repeatedly slowing down, stopping and holding static electric motor-driven equipment as, for example, in steel mill drives, cranes, hoists, movable bridges, conveyors, and also in marine or other similar service. In such heavy industrial service, the brake shoe linings inherently are subjected to very severe and even excessive wear, and hence, may require frequent replacement. This is particularly true in case the two brake shoes should be unequally released from the drum.

Hence, one of the objects of the present invention is to provide an improved self-adjusting floating fulcrum mechanism for insuring substantially equal movement of both shoes away from the drum when the brake is released.

Another object is to provide an improved single adjustment means for simultaneously adjusting the operating linkage of both shoes to compensate for wear of the linings thereof or of the brake drum or of the bearings interconnecting the linkage parts.

Another object is to provide self-alignment of both brake shoes when installing the brake or when accidental shifting of motor or brake with respect to each other occurs.

It is a further object of the invention to provide improved screw-threaded means for more effectively operating both brake shoes away from the drum in order to facilitate the replacement of the brake shoe linings and other wearing parts.

Figure 1:
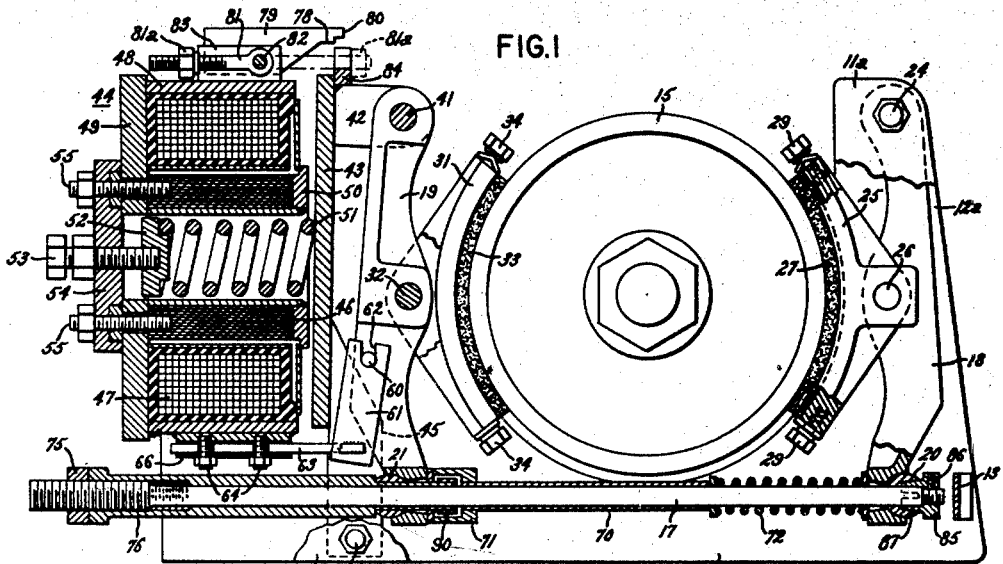
Figure 2:
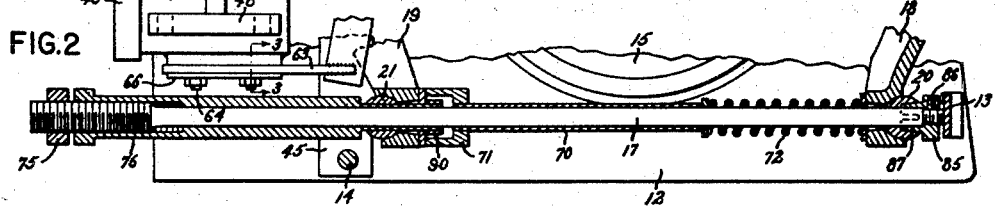
Figure 3:
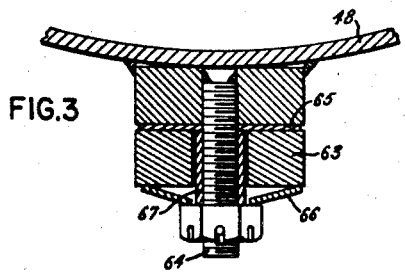
Figure 4:
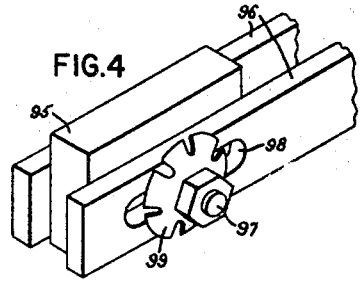
Figure 5:
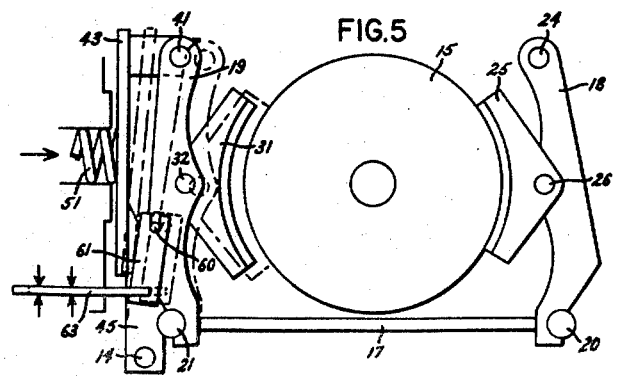

The improvements of the present invention will be more fully understood and its various objects and advantages further appreciated by referring to the following detail specification taken in conjunction with the accompanying drawings. Fig. 1 is a side view of a two-shoe electromagnetic brake embodying the improvements of the present invention, with part of the mounting frame broken away and the operating electromagnet shown in section in order more clearly to reveal the detail construction of the cooperating parts. Fig. 2 is a partial view of the lower part of the brake structure of Fig. 1 showing how the torque yokes carrying the brake shoes are forced apart by means of the adjustable screw threaded parts to facilitate renewal of the shoe linings. Fig. 3 is an enlarged sectional view along the line 3—3 of Fig. 2 showing the detail structure of one form of frictionally held sliding member that provides the floating fulcrum for insuring equal movements of the brake shoes away from the drum. Fig. 4 is a perspective view of a similarly enlarged modified frictionally held floating fulcrum construction that may be employed for the same purpose. Fig. 5 is a simplified schematic showing of the operating linkage of the brake of Fig. 1 useful in explaining the operating principle of the improved self-adjusting floating fulcrum mechanism of the present invention.

Referring now to the drawing, the two-shoe electromagnetic brake construction shown by way of illustration in Fig. 1 is generally similar to that disclosed in the Noon application. This brake structure comprises a base 10 formed of duplicate spaced-apart metal plates 11 and 12 that are joined together by the cross member 13, preferably bolted between the ends of the plates, and by various spacer pivot bolts such as 14 and 24. For the sake of clarity in the drawing, practically all of the nearer side plate 11 has been broken away in order more clearly to reveal the details of the brake operating linkage. Preferably, the inside edges of the base plates 11 and 12 are curved as shown to permit free horizontal axial movement of the brake drum 15 into and out of its normal operating position in the space between the two base plates 11 and 12.

The two-shoe brake operating linkage shown in Fig. 1 includes a tension rod 17 that extends subjacent the brake drum 15 in the space between the base plates 11 and 12. The tension rod 17 has the two torque yokes 18 and 19 pivotally interconnected thereto by means of the pivot pins 20 and 21. As will be explained more fully hereinafter, these pins 20 and 21 are relatively movable to vary the space therebetween. These relatively movable pins nest into suitable semicylindrical bearings formed in the lower ends of the torque yokes 18 and 19. Since the torque yokes are relatively movable, they are provided with suitable tapered openings to permit the tension rod 17 to extend through the lower ends thereof. Rod 17 also extends through each of the pivot pins 20 and 21 as shown.

The upper end of the torque yoke 18 is pivotally supported on the bearing pin 24 that is fixed between the upper ends of the spaced-apart upright arms 11a and 12a extending from the base 10 so as to nest yoke 18 therebetween. The brake shoe 25 is mounted centrally on the torque yoke 18 by means of the pivot pin 26 so that the brake shoe lining 27 will frictionally engage one side of the brake drum 15. Preferably this brake shoe lining 27 is removably held in place by means of the end clamping screws 29, so as to permit easy and quick replacement thereof. The opposite brake shoe 31 is mounted centrally on the torque yoke 19 by means of the pivot pin 32 so that the lining 33 removably secured to shoe 31 by means of the screws 34 will frictionally engage with the opposite side of the drum 15.

The upper end of the torque yoke 19 is pivotally supported by means of the movable pin 41. This pin is carried by the clevis lugs 42 formed on the movable armature 43 of the annular operating electromagnet 44. The armature 43 is in the form of a circular magnetic plate. This plate is pivotally mounted on the spacer pivot bolt 14 by means of a pair of spaced-apart lugs 45 extending from the lower part of the armature plate 43.

The electromagnet 44 is shown as of the powerful annular type having an inner annular magnetic core 46. The core 46 is surrounded by the annular windings 47 solidly encased in suitable molded insulating material. Thus the windings nest inside the cylindrical magnetic casing 48 that is closed on the outer side by the magnetic plate 49. As indicated in Fig. 2, the magnet casing 48 is provided with projecting mounting lugs 48' having suitable holding down screws for mounting the entire electromagnet 44 as a removable unit on the left-hand ends of the spaced-apart base plates 11 and 12. The magnet assembly therefore acts as a fourth member to space base plates 11 and 12.

Both brake shoes 25 and 31 are applied by a strong compression spring 51 nesting inside the annular core 46 with one end bearing against the pivoted armature plate 43. The other end of spring 51 is seated on the circular plate 52 that is adjustable by means of the adjusting screw 53 to vary the compression of the spring 51 and thereby obtain the desired torque rating of the brake. The adjusting screw 53 is carried by a bar 54 removably secured to the outer end plate 49 of the electromagnet 44 by means of the studs 55.

Thus whenever the windings 47 of the electromagnet are deenergized, the compression spring 51 will immediately move the armature 43 away from the annular impact pole piece 50 of the electromagnet 44 and thereby swing the movable pivot pin 41 about the spacer bolt 14 as an axis to carry the torque yoke 19 in the direction to engage the brake shoe 31 with the drum 15. Thereupon the pivot pin 32 of brake shoe 30 acts as a first fulcrum about which the torque yoke 19 pivots to exert tension on the rod 17 and thereby rotate the torque yoke 18 to engage the brake shoe 25 with the opposite side of the drum 15 so as to clamp the drum 15 between the shoes 25 and 31. In these respects the brake operating linkage shown in Fig. 1 is functionally the same as that disclosed and claimed in the previously mentioned Noon patent application.

In accordance with the present invention improved self-adjusting means are provided for establishing a second or floating fulcrum 60 for the torque yoke 19 that is located relative to the pivot pins 14, 41, 32 and the pin bearing 21 of the tension rod 17 in such a way as to insure substantially equal movements of the brake shoes 25 and 31 away from the drum 15 when the electromagnet 44 is energized to release the shoes 25 and 31. To accomplish this purpose, the second fulcrum pin 60 is fixed on the torque yoke 19 in substantial alignment with the axis of pins 14 and 41 and so as to be located on the torque yoke 19 substantially two-thirds of the distance between the brake shoe bearing pin 32 and the tension rod bearing pin 21. This produces a 1:2 ratio of arcuate movement of these pins about fulcrum pin 60. Thus a radius struck around the center of pin 14 through the center of pin 41 will substantially coincide for a limited distance with a radius struck around the center of pin 60 through the center of pin 41. Therefore, a limited arcuate movement of pin 41 to move the brake shoe 31 out of engagement with drum 15 can produce rotating motion of the torque yoke 19 about the pin 60 without changing the location of the pin 60. In other words, the pin 60 will be located at a null point of movement of the torque yoke 19 upon the limited angular movement of the armature 43 in the direction required to release the brake shoes.

To enable the pin 60 to act as the second or floating fulcrum for torque yoke 19, the plate 61 is provided with a notch or slot 62 for receiving the pin 60 rotatably therein. The notched plate 61 is carried by a bar 63 that is mounted for reciprocating frictional sliding movement on the underside of the magnet casing 48 towards and away from the drum 15 by means of the adjustable clamping studs 64, and the cooperating friction elements 65 and 66 shown more clearly in the enlarged view of Fig. 3. The friction element 65 is in the form of a non-corrosive shim, while the friction element 66 is in the form of a curved or bent leaf spring strip. The spacer tubes 67 around the studs 64 insure a fixed predetermined spring friction when the nuts are tightened.

When the electromagnet 44 is deenergized, the drum 15 is clamped between the shoes 25 and 31 as shown in Fig. 1. Under these conditions the floating fulcrum is self-adjusting as pin 60 automatically will always move the notched plate 61 to frictionally slide the bar 63 into proper operating position. Thus when magnet 44 is energized to attract armature 43, yoke 19 will pivot about the floating fulcrum pin 60 to move brake shoe 31 away from the drum 15. As a result the lower end of yoke 19 will move the tension member 17 to the right. The tube 70 surrounding the tension rod 17 is provided with an enlarged head 71 that engages the inside end of yoke 19 and exerts pressure through spring 72 on the inside end of yoke 18. This pivots yoke 18 about the pivot pin 24 to carry the brake shoe 25 an equal distance away from the drum 15.

As the brake shoe linings 32 and 33 wear, pin 60 will automatically be self-adjusted to new positions, progressively to the right of the position in which it is shown in Fig. 1. The frictionally held bar 63 will be moved correspondingly. In this way, the floating fulcrum comprising the pin 60 is always self-adjusting into the proper position required to equalize the release of both brake shoes 25 and 31 during the life of the shoe linings.

Furthermore, in case for any reason the axis of the brake drum 15 should shift, a similar automatic self-adjustment of the floating pivot provided by pin 60 will occur. Thus, as indicated schematically in Fig. 5, the axis of brake drum 15 has been shifted to the right while the brake shoes 25 and 31 were released therefrom. When the armature 43 is released, to clamp the drum 15 between the shoes, yoke 19 and shoe 31 will be moved from their full line position to their dash-dot line position. At the same time the frictionally held rod 63 and plate 61 will be moved by pin 60 from their full line position to their dot-dash line position. In this latter position, the floating pivot provided by pin 60 will serve to equalize the release of the shoes 25 and 31 when armature 43 is again attracted.

As the brake shoe linings wear, only one simple adjustment is required to restore the air gap of armature 43 to its normal value. This is accomplished by first loosening the lock nut 75 and then rotating the tubular adjusting member 76 that is in screw-threaded telescoping engagement with the end of the tension rod 17 as shown in Figs. 1 and 2. In this way the pin 21 is carried towards the pin 20 in order to reposition the yokes 18 and 19 to clamp the drum 15 between the shoes when the armature 43 is restored to its proper alignment with the shoulder 78 formed on the air gap adjustment gauge 79. The air gap gauge 79 is fixedly mounted on the casing 48 of the electromagnet. Such adjustment for brake lining wear preferably should be made before the armature air gap increases sufficiently to align armature 43 with the end 80 of the air gap gauge 79 which represents the maximum permissible air gap.

In order to replace worn brake shoe linings, the eyebolt 81 pivoted on pin 82 extending from the block 83 welded to the casing 48 of the electromagnet is swung into engagement with the fork 84 welded to the top of the armature 43 as indicated by the dash-dot lines in Fig. 1. Then upon tightening of the nut 81a, the armature 43 is drawn against the force of biasing spring 51 into engagement with the impact face 50 of the electromagnet. As a result both of the shoes 25 and 31 are moved away from the drum 15. Then the adjustable threaded telescoping member 76 may be rotated in the reverse direction as indicated in Fig. 2 after loosening the lock nut 75. The stop nut 85 that is fixed to the rod 17 by the set screw 86 and its conical slotted portion 87 that grip rod 17 like a collet chuck are provided with flat portions that nonrotatably interlock with suitable recesses formed in the pin 20. This will always prevent rotation of the rod 17. Consequently, when the tubular member 76 is rotated in the reverse direction, the end of rod 17 is forced into engagement with the stop bar 13. Then further rotation of the tubular adjustment member 76 will cause the enlarged head 90 thereof to exert a force against the inside of yoke 19. This force will swing yoke 19 about the pivot pin 41 and thereby carry the floating fulcrum pin 60 to slide the frictionally held bar 63 to the left. This screw-threaded forcing of the brake shoes 25 and 31 apart is continued until there is ample clearance between the shoes and the brake drum for the insertion of new linings. In this way the improved screw-threaded form of slack adjuster cooperates with the frictional mounting means for the floating fulcrum pin 60 to facilitate the insertion of the new linings. After the new linings are inserted, the tubular member 76 is readjusted to obtain the normal air gap setting of armature 43 when the drum 15 is clamped between the shoes with the new linings as indicated in Fig. 1. The spring 72 serves at all times to exert a biasing force tending to hold the yokes 18 and 19 in operating engagement with the pivot pins 20 and 21 as the distance therebetween is varied by rotation of the single adjustment member 76. The biasing of yoke bearing ends also eliminates hammering of pins 20 and 21 against the lower bearings in the yoke.

Fig. 4 shows a modified form of the friction mounting for the floating fulcrum pin 60. In this case the block 95 is welded to the magnet casing 48 to be straddled by the two arms 96 having their broken away ends pivoted on the pin 60. The bolt 97 is fixed in the block 95 and extends through suitable slots 98 formed in each of the arms 96. A spring washer 99 serves to hold the straddling arms 96 in frictional engagement with the block.

While I have described by way of illustration preferred embodiments of my invention, many modifications will occur to those skilled in the art and I, therefore, wish to have it understood that I intend in the appended claims to cover all such forms and modifications as fall within the true spirit and scope of my invention.

What I claim as new and desire to secure by Letters Patent of the United States, is:

1. A brake comprising a rotatable drum, a pair of brake shoes therefor, an operating linkage interconnecting the shoes including a floating lever having one of the shoes carried between its ends thereon to provide a fulcrum for clamping the drum between the shoes upon movement of the floating lever to engage the one shoe with the drum, and means providing a second fulcrum for said floating lever displaced from the one brake shoe to control the movement of both shoes out of engagement with the drum upon opposite movement of the floating lever.

2. A brake comprising a rotatable drum, a pair of brake shoes therefor, an operating linkage interconnecting the shoes including a floating lever having one of the shoes carried between its ends thereon to provide a fulcrum for clamping the drum between the shoes upon movement of the floating lever to engage the one shoe with the drum, and means including frictional holding members for providing a floating fulcrum for said floating lever displaced from the one brake shoe to effect substantially equal movement of both shoes out of engagement with the drum upon opposite movement of the floating lever.

3. A brake comprising a rotatable drum, a pair of brake shoes therefor, each having a pivotally mounted torque yoke carrying the shoe between its ends thereon and one yoke having a floating pivot at one end and an operating connection at the other end with the other yoke to clamp the drum between the shoes upon movement of the floating pivot in one direction, and means providing a fulcrum for said one torque yoke spaced between the shoe and the operating connection to effect substantially equal movement of both shoes out of engagement with the drum upon opposite movement of the floating pivot.

4. A brake comprising a rotatable drum, a tension member having relatively movable torque yokes projecting therefrom to straddle the drum and each yoke having a brake shoe carried between its ends thereon to frictionally engage opposite sides of the drum, means providing a fixed mounting pivot for the projecting end of one of the yokes and a movable mounting pivot for the projecting end of the other yoke to clamp the drum between the shoes upon movement of the movable mounting pivot toward the fixed mounting pivot, and means providing a fulcrum for the other yoke to effect substantially equal movement of both brake shoes away from the drum upon movement of said movable mounting pivot away from said fixed mounting pivot.

5. A brake comprising a rotatable drum, an electromagnet having an armature pivotally mounted at one side of the drum, a spring biasing the armature towards the drum, a floating lever having one end pivotally mounted on the armature, a brake shoe carried on the lever between its ends to engage the one side of the drum, a lever having a fixed pivot at one end thereof and having a brake shoe carried between its ends thereon to engage the opposite side of the drum, a member interconnecting the other ends of the levers to clamp the drum between the shoes when the armature is released, and means providing a pivot for the floating lever to effect substantially equal movement of both shoes away from the drum when the armature is attracted.

6. A brake comprising a rotatable drum, a pair of brake shoes therefor, an operating linkage including a pair of torque yokes, each having one of the shoes carried between its ends thereon to engage the drum upon relative movement of the ends thereof, and means for interconnecting the other ends of the yokes to clamp the drum between the shoes comprising a first rod member, a second rod member mounted for lengthwise sliding movement with respect to said first rod member to provide lengthwise separation of corresponding ends of said members, a bearing member on each of said corresponding ends for pivotally engaging an end of a corresponding one of said yokes and a screw thread connection between the other corresponding ends of said first and second rod members for adjusting the space between the bearing members to compensate for wear of the brake linings.

7. A brake comprising a rotatable drum, a pair of brake shoes therefor, an operating linkage including a pair of torque yokes each pivotally mounted at one end and having one of the shoes carried between its ends thereon to engage the drum, and means for interconnecting the other ends of the yokes to clamp the drum between the shoes comprising a relatively long rod member, a relatively short tubular member telescoping one end of said rod member and providing lengthwise separation of corresponding ends of said memebrs, a bearing member on each of said separated ends for pivotally engaging an end of a corresponding one of said yokes and a screw thread connection between the other corresponding ends of said rod and tubular members for relatively positioning said bearing members to compensate for wear of the brake linings.

8. A brake comprising a rotatable drum, a pair of brake shoes therefor, an operating linkage including a pair of torque yokes each pivotally mounted at one end and having one of the shoes carried between its ends thereon to engage the drum, and means for interconnecting the other ends of the yokes to clamp the drum between the shoes comprising a relatively long rod member, a relatively short tubular member telescoping one end of said rod member and providing lengthwise separation of corresponding ends of said rod members, a bearing member on each of said separated ends for pivotally engaging an end of a corresponding one of said yokes, a second tubular member surrounding said rod member in the space between said bearing members, a compression spring surrounding said rod member in the space between one of said bearing members and one end of said second tubular member and acting to increase the space between said bearing members, and a screw thread connection between said rod member and said relatively short tubular member for compressing said spring to reduce the distance between the bearing members to compensate for wear of the brake shoes.

9. A brake comprising a rotatable drum, a pair of brake shoes therefor, an operating linkage including a pair of torque yokes each having one of the shoes carried between its ends thereon to engage the drum upon relative movement of the ends thereof, and means for interconnecting the other ends of the yokes to clamp the drum between the shoes comprising a first rod member, a second rod member mounted for lengthwise sliding movement with respect to said first rod member to provide lengthwise separation of corresponding ends of said members, a bearing member on each of said corresponding ends for pivotally engaging an end of a corresponding one of said yokes, a compression spring surrounding one of said rod members and acting to increase the space between the bearing members and means including a screw thread connection between the other corresponding ends of said rod members for compressing the spring to reduce the space between the bearing members to compensate for wear of the brake linings.

10. A brake comprising a rotatable drum, a pair of brake shoes therefor, each having a pivotally mounted torque yoke carrying the shoe between its ends and one yoke having a floating pivot at one end and an operating connection at the other end with the other yoke to clamp the drum between the shoes upon movement of the floating pivot in one direction, means providing a fulcrum for said one torque yoke spaced between the shoe and the operating connection to effect substantially equal movement of both shoes out of engagement with the drum upon opposite movement of the floating pivot and said operating connection comprising a tension rod having relatively movable spaced-apart bearing members for interconnecting the ends of the yokes and provided with means including screw threads at one end of the tension rod for adjusting the space between the bearing members to compensate for wear of the brake linings.

11. A brake comprising a rotatable drum, a pair of brake shoes therefor, an operating linkage including a pair of torque yokes, each having one of the shoes carried between its ends thereon, a tension rod having relatively movable spaced-apart bearing members for interconnecting the ends of the yokes to clamp the drum between the shoes upon relative movement of the other ends thereof and provided with means including screw threads at one end of the tension rod for adjusting the space between the bearing members to compensate for wear of the brake linings, and means providing a floating fulcrum for one of the torque yokes displaced from the brake shoe thereon to control the movement of both shoes out of engagement with the drum upon opposite movement of the corresponding ends of the torque yokes.

References Cited in the file of this patent

UNITED STATES PATENTS

| | | |
|---|---|---|
| 1,672,314 | Hall | June 5, 1928 |
| 1,784,283 | Goldsmith et al. | Dec. 9, 1930 |
| 1,852,857 | Price | Apr. 5, 1932 |
| 2,308,340 | Newlon | Jan. 12, 1943 |
| 2,363,152 | Schnell | Nov. 21, 1944 |
| 2,436,880 | Burgett | Mar. 2, 1948 |
| 2,731,115 | Hodgson | Jan. 17, 1956 |